United States Patent
Flores (10) Patent No.: US 9,712,722 B2
(45) Date of Patent: Jul. 18, 2017

(54) PATTERNING CLEAR MARKING MATERIAL BASED ON COLOR DARKNESS

(71) Applicant: Xerox Corporation, Norwalk, CT (US)

(72) Inventor: Eliud Robles Flores, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/867,202

(22) Filed: Sep. 28, 2015

(65) Prior Publication Data
US 2017/0094131 A1    Mar. 30, 2017

(51) Int. Cl.
*H04N 1/60* (2006.01)
*G06K 15/10* (2006.01)

(52) U.S. Cl.
CPC ......... *H04N 1/6075* (2013.01); *G06K 15/105* (2013.01); *H04N 1/6008* (2013.01); *H04N 1/6097* (2013.01); *H04N 2201/0094* (2013.01)

(58) Field of Classification Search
USPC .......................................................... 399/40
See application file for complete search history.

(56) References Cited

U.S. PATENT DOCUMENTS

| | | | |
|---|---|---|---|
| 4,721,635 A * | 1/1988 | Helinski | B41M 1/18 156/277 |
| 5,234,783 A | 8/1993 | Ng | |
| 6,539,191 B2 * | 3/2003 | Itaya | G03G 13/013 399/237 |
| 7,304,770 B2 | 12/2007 | Wang et al. | |
| 7,324,241 B2 | 1/2008 | Eschbach et al. | |
| 7,352,493 B2 | 4/2008 | Liu et al. | |
| 7,639,400 B2 | 12/2009 | Hains | |
| 7,924,460 B2 | 4/2011 | Ng | |
| 8,190,076 B2 | 5/2012 | Omata | |
| 8,285,187 B2 * | 10/2012 | Kimura | G03G 15/5062 399/341 |
| 8,477,376 B2 | 7/2013 | Robinson et al. | |
| 8,506,068 B2 * | 8/2013 | Mimura | B41J 2/2114 347/100 |
| 8,554,092 B2 * | 10/2013 | Tanaka | G03G 15/50 399/15 |

(Continued)

OTHER PUBLICATIONS

Burrell Imaging, Instructions for Ordering Dimensional Printing, www.burrellcolourimaging.com, pp. 1-2, USA.

*Primary Examiner* — Clayton E Laballe
*Assistant Examiner* — Linda B Smith
(74) *Attorney, Agent, or Firm* — Gibb & Riley, LLC (57) ABSTRACT

A printing engine prints an electronic document in a first printing pass to produce a printed media sheet having first markings. Additionally, a processor determines the amount of the clear marking material to print on top of the previously printed media sheet (which already has those first markings). The processor determines different amounts of clear marking material to print on first and second areas of the printed media sheet, based on different darkness levels of first and second colors in the first and second areas of the sheet. After the first printing pass, the printing engine prints (on the previously printed media sheet which has the first markings) those different amounts of clear marking material on the first area and the second area in a second printing pass, and this produces a printed media sheet having gloss markings.

20 Claims, 8 Drawing Sheets

(56) References Cited

U.S. PATENT DOCUMENTS

| | | | |
|---|---|---|---|
| 8,649,696 B2* | 2/2014 | Takemura | G03G 15/6585 399/39 |
| 2005/0128524 A1 | 6/2005 | Liu et al. | |
| 2005/0135851 A1 | 6/2005 | Ng et al. | |
| 2006/0110193 A1* | 5/2006 | Emmert | G03G 8/00 399/341 |
| 2007/0211100 A1* | 9/2007 | Mizutani | B41J 2/17566 347/19 |
| 2007/0268511 A1* | 11/2007 | Crichton | B41M 1/18 358/1.14 |
| 2009/0015849 A1* | 1/2009 | Jahana | B41J 2/2146 358/1.8 |
| 2009/0067863 A1* | 3/2009 | Sakata | G03G 15/0194 399/66 |
| 2012/0050369 A1* | 3/2012 | Seki | B41J 2/2114 347/15 |
| 2012/0189337 A1* | 7/2012 | Takemura | G03G 15/6585 399/67 |
| 2012/0251133 A1* | 10/2012 | Shindo | G03G 15/502 399/21 |
| 2013/0028620 A1* | 1/2013 | Terao | G03G 15/0189 399/46 |
| 2013/0084439 A1* | 4/2013 | Ojiro | B41J 2/2114 428/195.1 |
| 2013/0128317 A1 | 5/2013 | Chapman et al. | |

* cited by examiner

PATTERNING CLEAR MARKING MATERIAL BASED ON COLOR DARKNESS

BACKGROUND

Systems and methods herein generally relate to printers, printing systems, and printing methods, and more particularly to using clear marking material (clear toner) to achieve various printing effects.

Clear marking materials can be used to achieve different printing effects, such as gloss effects, dimensional effects, etc. For example, clear toner includes non-pigmented marking particles, and is formed of the same particles used in primary (e.g., red, green, blue (RGB)) and subtractive (e.g., cyan, magenta, yellow, and black (CMYK)) toners (except that clear toner excludes the pigmenting component). Clear toner can provide a noticeable glossy appearance. Such clear marking materials can be applied in the first printing pass, or in one or more subsequent printing passes that print clear marking material on a previously printed sheet.

In certain instances, clear toner may selectively provide a slight color cast or gloss. The gloss and/or cast may be used to create a visual appearance of a generally transparent image on the substrate. For example, clear toner can be patterned to create a mark in the form of an authenticating or watermark rendered on a substrate, and such watermarks are independent of other printing on the sheet. The mark is observed as a generally glossy image.

Also, clear marking materials can be used to produce dimensional printing that gives printed products a raised or textured image. In some examples, specific graphic elements can be selected to receive dimensional ink so that they appear "raised" off of the page. For example, a swirl, snowflake or even each line of text can appear raised off of the page. Dimensional printing can also provide a texture that spreads over the entire product (like a flood coat), which can be excepted for image area(s).

SUMMARY

Printing systems herein include, among other components a processor and a printing engine operatively (meaning directly or indirectly) connected to the processor. The printing engine prints using color marking materials, where one of the color marking materials (e.g., a spot colorant) can be a clear marking material (e.g., clear toner). At some point, the processor will receive an electronic document (e.g., a document stored electronically in electronic device memory) to print. The printing engine prints the electronic document in a first printing pass to produce a printed media sheet having "first" markings.

The electronic document can have a first color in a first area and a second color in a second area, and the first color has a different darkness level relative to the second color. For example, the first color can be a different color from the second color, the first color can be a different color shade of the second color (or one of the "colors" can simply be the white sheet (e.g. no marking material)), etc., but in any case the first color has a different darkness level relative to the second color.

Additionally, the processor determines the amount of the clear marking material to print on top of the previously printed media sheet (which already has those first markings). More specifically, here the processor determines the different amounts of clear marking material to print on the first area and the second area, based on the different darkness levels of the first and second colors in the first and second areas of the sheet. After the first printing pass, the printing engine prints (on the previously printed media sheet which has the first markings) those different amounts of clear marking material on the first area and the second area in a second printing pass, and this produces a printed media sheet having gloss markings. More specifically, this process of printing the different amounts of the clear marking material on the first area and the second area causes relatively lighter items on the printed media sheet to have a different amount of clear marking material relative to relatively darker items on the printed media sheet. The printing engine can repeat the second printing pass multiple times to achieve the desired gloss effect.

Stated in method terms, methods herein receive an electronic document to print into a processor. The electronic document has a first color in a first area and a second color in a second area. The first and second colors can be different colors, different shades of the same color (or one of the "colors" can simply be the white sheet (e.g. no marking material)), etc., but in any case, the first color has a different darkness level relative to the second color. The processor is operatively connected to a printing engine that prints using color marking materials, and one of the color marking materials can be a clear marking material. The methods herein print the electronic document using the printing engine in a first printing pass to produce a printed media sheet having first markings.

The methods herein also determine the amount of the clear marking material to print on the printed media sheet that has the first markings to determine different amounts of the clear marking material to print on the first area and the second area, based on different darkness levels of the first area and the second area (using the processor). Then, these methods print (using the printing engine) those different amounts of the clear marking material on the first area and the second area in one or more second printing passes (directly on the printed media sheet that has the first markings from the first printing pass); and this produces a printed media sheet having gloss markings. The process of printing different amounts of clear marking material on the first and second areas (potentially in many "second" printing passes) causes relatively lighter items on the printed media sheet to have a different amount of the clear marking material when compared to relatively darker items on the printed media sheet.

BRIEF DESCRIPTION OF THE DRAWINGS

Various exemplary systems and methods are described in detail below, with reference to the attached drawing figures, in which.

DETAILED DESCRIPTION

As mentioned above, clear toner may be used to produce dimensional printing that gives printed products a raised or textured image. Thus, in printing techniques, the application of multi-pass clear, also called dimensional clear, can be simply an application of a flood (100% solid clear) over an image (CMYK). This use of 100% solid clear for "dimensional" clear is a carryover from the "spot" clear application, in which the process does require 100% clear. The reality is that most printing techniques do not need a 100% layer of clear to create dimensionality.

Applying a 100% halftone layer of clear to achieve dimensionality poses some drawbacks. For example, use of a 100% layer of clear is expensive (a large quantity of clear toner is used), is low resolution, and finally this requires many passes (the process needs many passes to overcome the "flood" of clear over CMYK). For example, one clear toner formulation (e.g., 10% gel) requires 10 passes (100% solid clear) at a stable developed mass per unit area (e.g., DMA of 0.5) to build dimensionality. This produces the 30-40 um height typical of dimensional prints. Some systems use up to 30 passes to create dimensional printing. However, the more passes, the more exponential the image quality damage.

In view of this, systems and methods described herein provide ways to create dimensionality with a minimal number of passes and without increasing mass (DMA). Thus, system and methods avoid using 100% layer of clear to create dimensionality, and instead use grey-level rendition (or grey-shading) of the CMYK image to automatically vary the amount of clear toner applied to different areas of the image. Such provides a gloss effect that enhances the dimensional features in a subtle but efficient manner, and the grey shading of clear by systems and methods herein minimizes drawbacks of methods that use 100% solid clear in a flooding process. For example, the systems and methods herein save toner because the clear marking material is contoured, not flooded; provide high resolution because clear is applied in grey-level fashion; and minimize the number of passes because the entire image does not need to be flooded (and this increases resolution by reducing the number of passes that can degrade image quality, and creates dimensionality faster because less printing passes are utilized).

Figure 1:
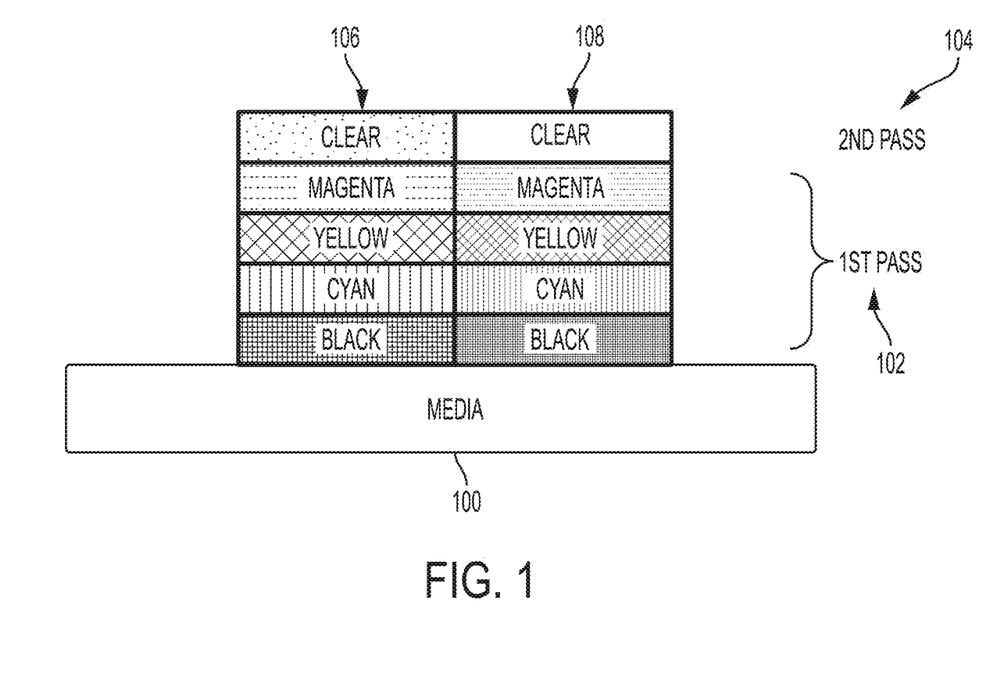
FIG. 1 is a cross-sectional schematic diagram illustrating printing performed by methods and devices herein.

For example, as shown in cross-sectional view in FIG. 1, two graphical elements 106, 108 are shown as being printed immediately adjacent to one another on a sheet of print media 100. Graphical element 108 is darker than graphical element 106 because graphic element 106 is printed using a relatively lower-halftone percentage (where less than all available pixels in a given area are printed); while graphic elements 108 is printed using relatively higher-halftone percentage (where more pixels (potentially all pixels) are utilized in a given area). Therefore, graphic item 108 will be darker than the graphic item 106 when viewed by the user, even though graphic items 106 and 108 potentially use the same colors.

As also shown in FIG. 1, during the first printing pass 102, the pigmented colorants (e.g., CMYK, RGB, etc.) are printed in a pattern on the sheet of print media 100. In one or more second printing passes 104, clear marking material (lacking any pigment) is printed in different concentrations (different densities, different halftone percentages, different darkness levels, etc.) on the different graphical elements 106, 108 printed in the first pass 102. More specifically, in this example, in the second printing pass 104, the clear marking material is applied in the same halftone percentages that the pigmented marking materials were applied to the graphical elements 106 and 108 in the first printing pass 102. This causes less of the clear marking material to be applied to the lower-halftone percentage graphic elements 106 relative to the higher-halftone percentage graphic element 108 because the lighter halftoning process of graphic item 106 utilizes less of all marking materials relative to the heavier halftoning process of graphic item 108.

Therefore, as shown in FIG. 1 the non-imaged areas may not be printed with any form of marking material (e.g. are bare); while the imaged areas are contoured with a "grey level" of clear. In other processes herein, the opposite can occur, where clear marking material is applied in an anti-grey shading fashion. Thus, in some situations, the clear marking material can be printed in concentrations that oppose (e.g., are inverse to) the grey levels of the pigmented marking materials. In other alternatives, clear may be printed only in the white areas where no other marking material is printed in the second printing passes, which is suitable for images where white is intended to "shine."

Figure 2:
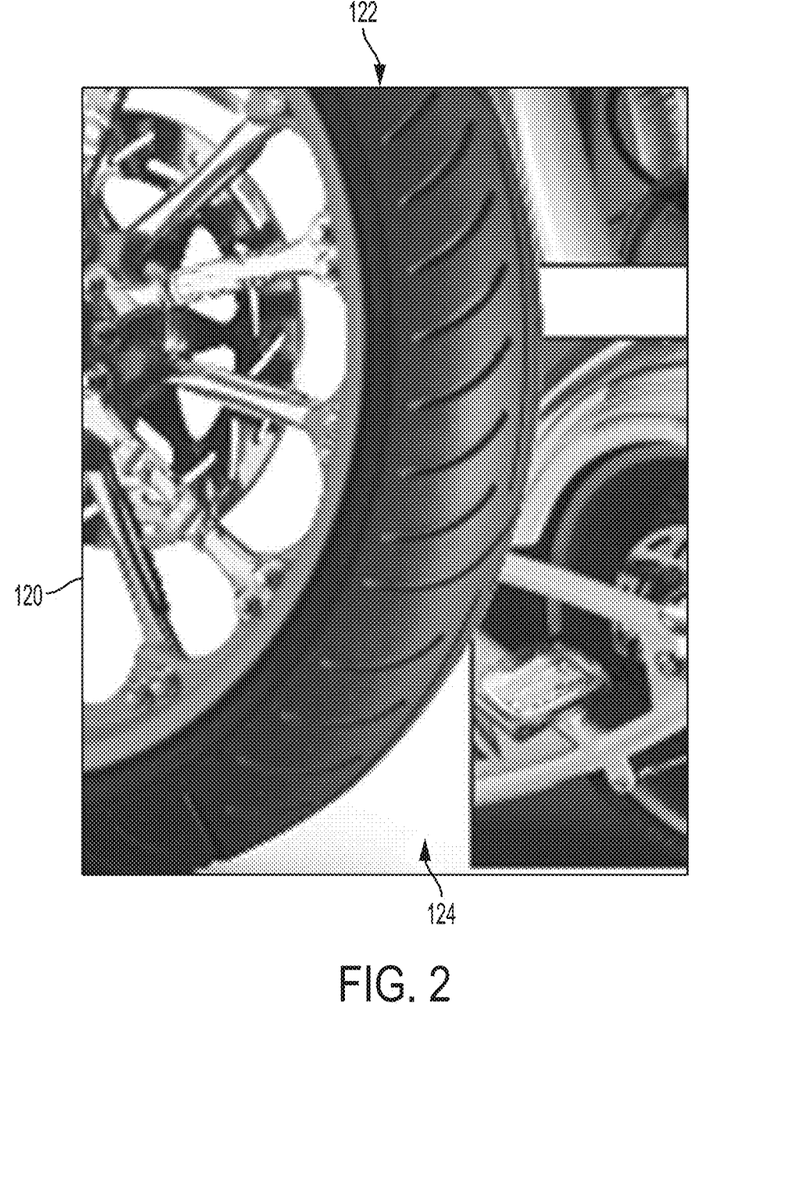
FIG. 2 is a plan-view schematic diagram illustrating printing performed by methods and devices herein.
Figure 3:
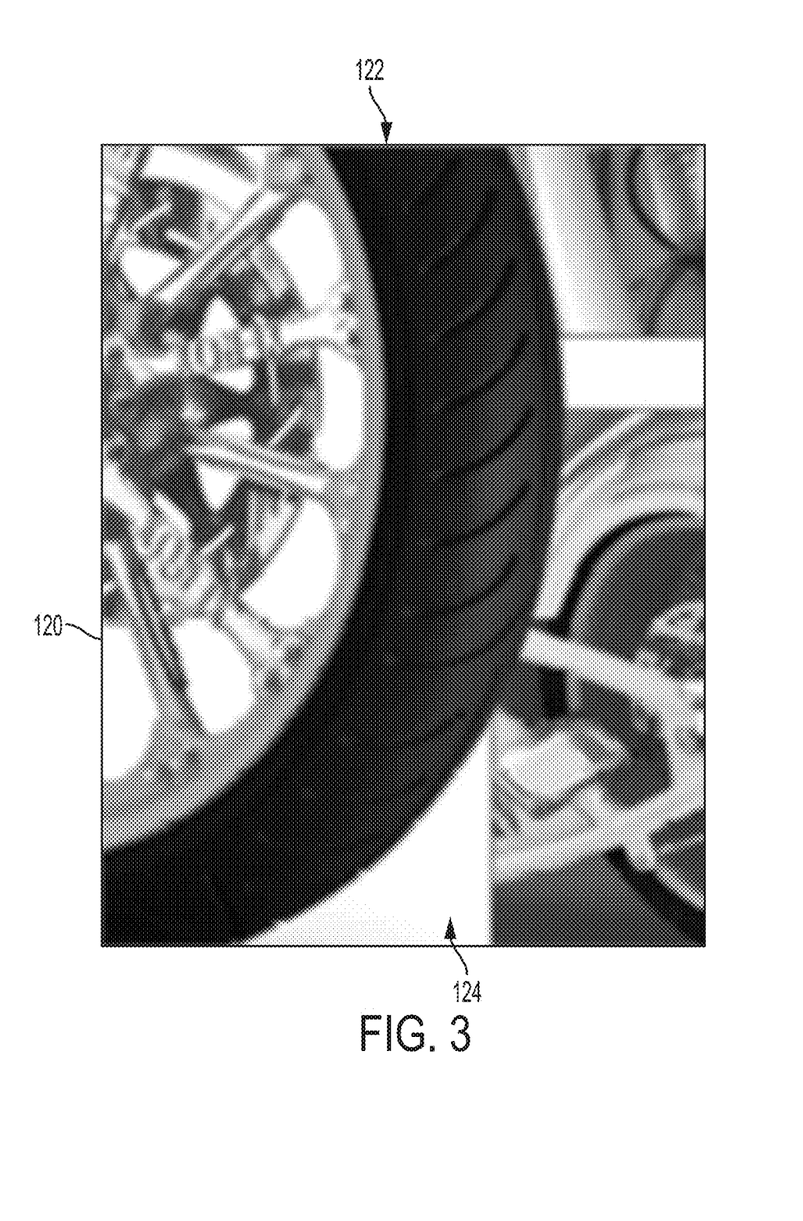
FIG. 3 is a plan-view schematic diagram illustrating printing performed by methods and devices herein.
Figure 4:
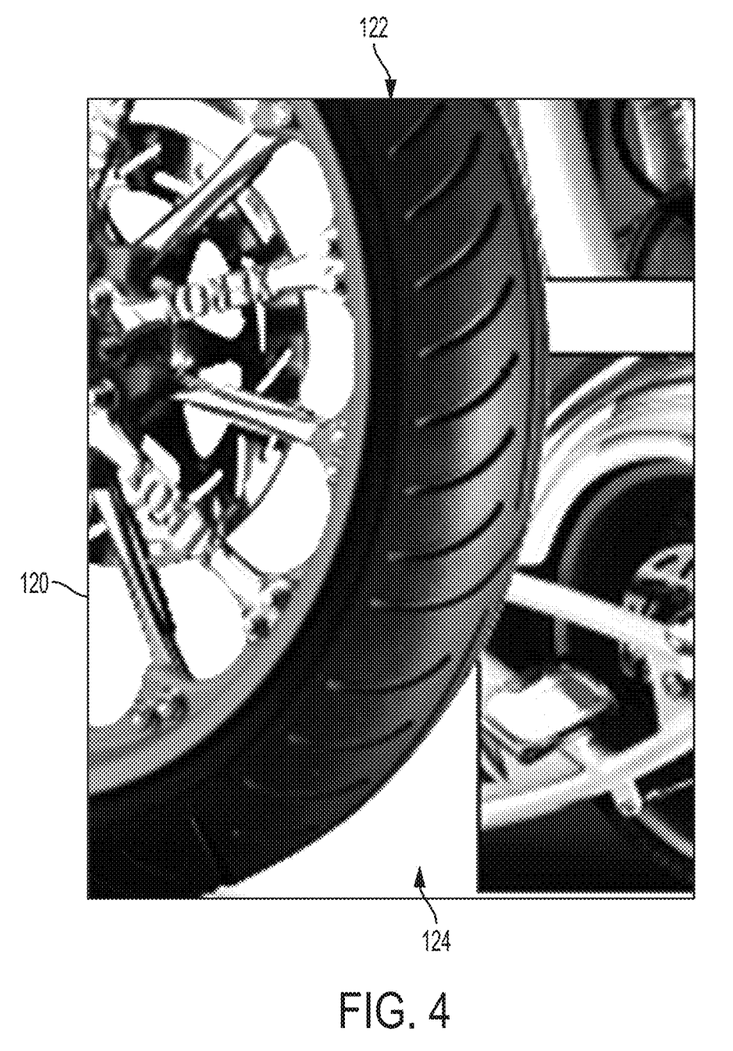
FIG. 4 is a plan-view schematic diagram illustrating printing performed by methods and devices herein.

This process of changing the amount of clear marking material that is printed in the second passes based upon the darkness of the graphical elements within the printed document is illustrated through the comparison of plan-view or top-view FIGS. 2-4. The image in FIGS. 2-4 includes many graphical elements including some dark features (a tire identified using identification numeral 122) and some light features (whitespace identified using identification numeral 124).

More specifically, FIG. 2 illustrates an original image 120 that does not include clear marking material (is the first printing pass only); FIG. 3 illustrates the same image 120 using a flood clear process (where many secondary print passes of 100% clear are applied to the entire image evenly); and FIG. 4 illustrates the same image 120 printed using an variable amount of clear marking material in the secondary printing passes that matches the halftoning value (darkness value) of the underlying graphic item. Therefore, in FIG. 4, none of the clear marking material is applied to the areas of the image having the lighter color (e.g., areas 124); while, to the contrary, relatively more of the clear marking material is applied to the darker areas of the image 122 during the secondary printing passes, and such clear marking material is printed in greater amounts as the darkness of the features 122 increases (as the features become relatively darker when compared to the lightest areas 124).

Figure 5:
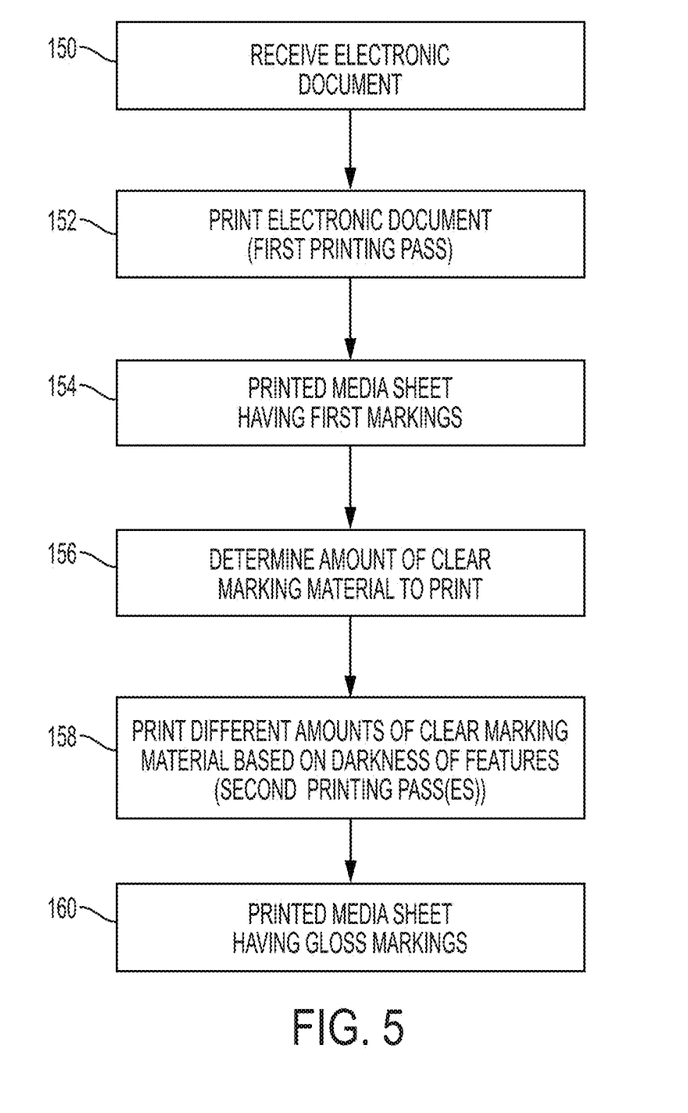
FIG. 5 is a flow diagram of various methods herein.

FIG. 5 is flowchart illustrating exemplary methods herein. As shown, such methods receive an electronic document to print into a processor in item 150. The electronic document has a first color in a first area and a second color in a second area (e.g., areas 122 and 124 in FIG. 2). The first and second colors can be different colors, different shades of the same color (or one of the "colors" can simply be the white sheet (e.g. no marking material)), etc., but in any case, the first color has a different darkness level relative to the second color. The processor is operatively connected to a printing engine that prints using color marking materials, and one of the color marking materials can be a clear marking material. As shown in item 152, the methods herein print the electronic document using the printing engine in a first printing pass to produce a printed media sheet having first markings 154.

As show in item 156, the methods herein also determine the amount of the clear marking material to print on the printed media sheet that has the first markings 154 to determine different amounts of the clear marking material to print on the first area and the second area, based on different darkness levels of the first area and the second area (using the processor). More specifically, the processing in item 156 can control the amount of clear marketing material utilized based on many different, factors including pixel density, color, darkness, etc.

Therefore, the processing in item 156 can match the halftoning percentage of the clear marking material to the halftoning percentage utilized for the pigmented marking materials. Thus, if an area of the printed document was printed with a 35% measure (based on any measure such as halftone percentage, pixel density percentage, darkness percentage, ink saturation percentage, etc.) of a pigmented marking material, the same area would be reprinted with the same percentage measure (e.g., 35% in this example) of clear (non-pigmented) marking material in the second printing passes.

Alternatively, the processing in item 156 can match the halftoning percentage of the clear marking material to the inverse (complementary) halftoning percentage utilized for the pigmented marking materials. Thus, if an area of the printed document was printed with a 35% measure (based on any measure such as halftone percentage, pixel density percentage, darkness percentage, ink saturation percentage, etc.) of a pigmented marking material, the same area would be printed with the complementary percentage measure (e.g., 65% in this example) of clear (non-pigmented) marking material in the second printing passes. Here, the "inverse" or "complementary" percentages are two percentages that are the same distance from a midpoint (50%), but such distances have an opposite polarity from the midpoint. Examples of complementary percentages include 10%-90%; 25%-75%; 40%-60%, etc.

Additionally, the processing in item 156 can include various limits or thresholds that prevent any clear marking material from being printed, or that cause the maximum amount of possible clear marking material to be printed. For example, the processing in item 156 can restrict clear marking material from being printed unless the pigmented marking material on the printed sheet has a percentage measure that exceeds a threshold (e.g., the same 35% measure discussed above). Oppositely, the processing in item 156 can cause the maximum amount of clear marking material (e.g., a 100% of any marking material measure discussed above) to be printed on any pigmented marking material on the printed sheet that has a percentage measure that exceeds 65%.

Thus, such limits and thresholds can be utilized to cause the whitespace of the printed sheet (the area of the printed sheet that did not receive any pigmented marking material) to receive the maximum amount of clear marking material, or to receive none of the clear marketing material, depending upon the limits that are established, and the effects that such limits have on the printing of the clear marketing material during the second printing passes. As would be understood by those ordinarily skilled in the art, the foregoing percentage numbers are only examples, and the systems and methods herein can utilize any limits or thresholds, and any percentages of marking material concentrations.

Then, as shown in item 158, these methods print (using the printing engine) those different determined amounts of the clear marking material on the first area and the second area in one or more second printing passes (directly on the printed media sheet that has the first markings from the first printing pass); and this produces a printed media sheet having gloss markings 160. The process of printing different amounts of clear marking material on the first and second areas (potentially in many "second" printing passes) in item 158 causes relatively lighter items on the printed media sheet to have a different amount of the clear marking material when compared to relatively darker items on the printed media sheet.

As would be understood by one ordinarily skilled in the art, the processes described herein cannot be performed by human alone (or one operating with a pen and a pad of paper) and instead such processes can only be performed by a machine (especially when the process of preparing image data for printing is considered). For example, if one were to manually attempt to calculate marking material quantities for pixels of a print engine, the manual process would be sufficiently inaccurate and take an excessive amount of time so as to render the results useless. Specifically, processes such as receiving electronic data, converting such data for printing, controlling printing engines, etc., requires the utilization of different specialized machines, and humans performing such processing would not produce useful results because of the time lag, inconsistency, and inaccuracy humans would introduce into the results.

Additionally, the methods herein solve many highly complex technological problems. For example, as mentioned above, use of a 100% layer of clear is expensive (a large quantity of clear toner is used), is low resolution, and finally this requires many passes (the process needs many passes to overcome the "flood" of clear over CMYK).

Figure 6:
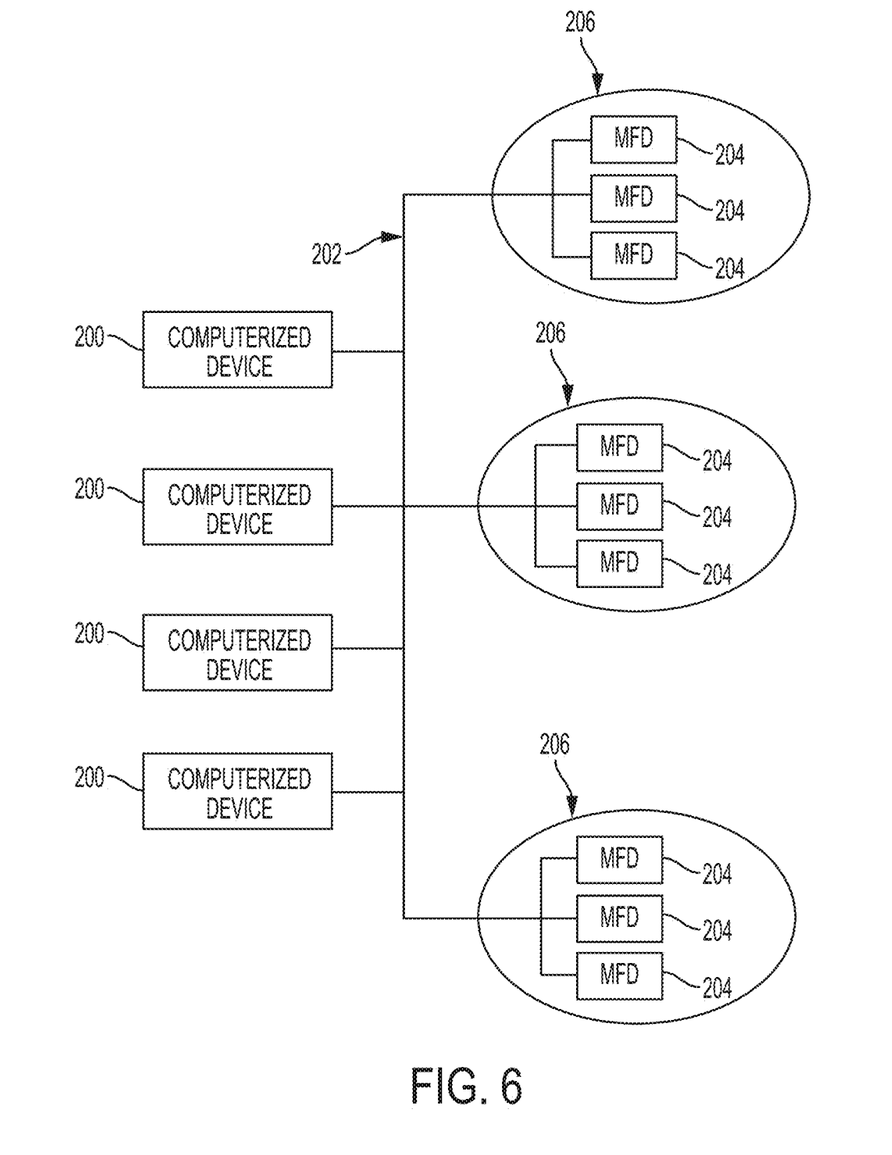
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202, and any of the foregoing can perform the processing shown in FIG. 5.

Figure 7:
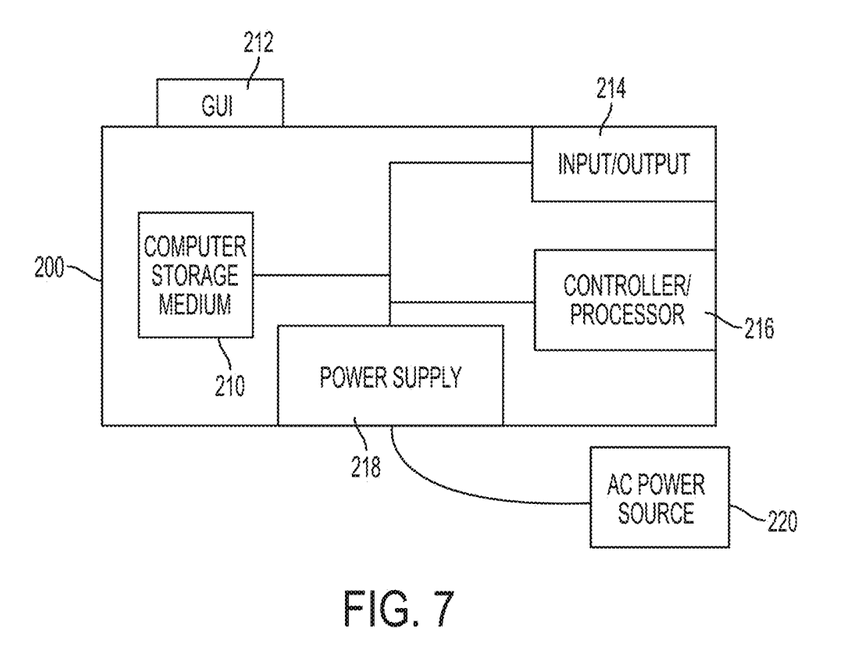
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc), etc.

Figure 8:
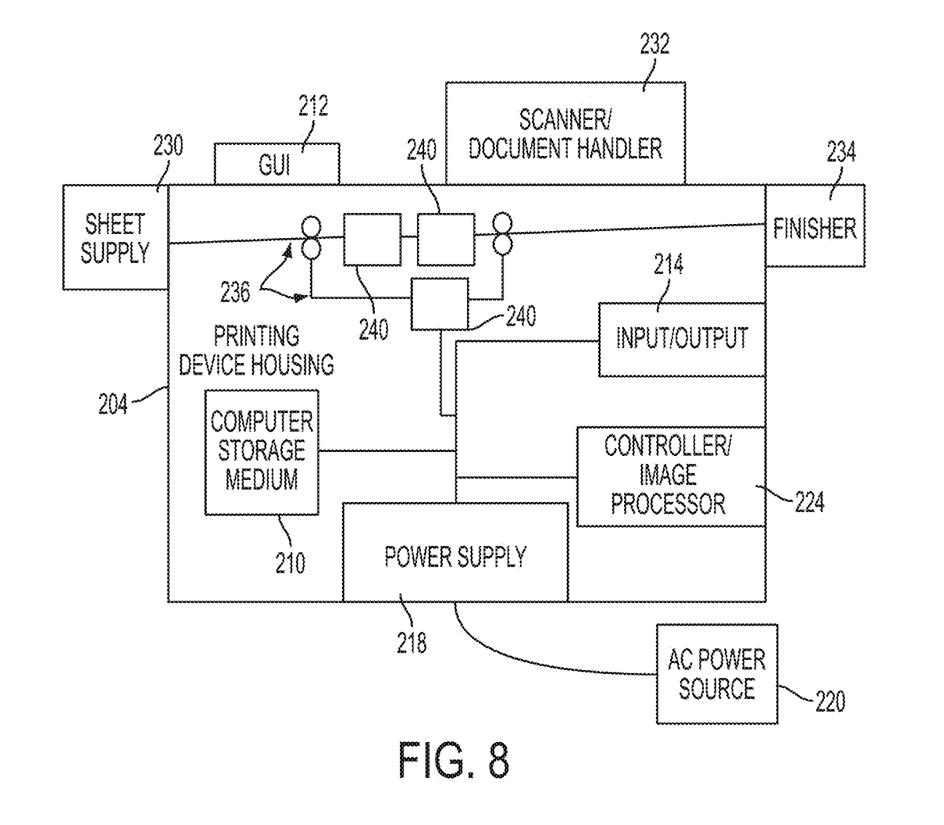
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 8 is only one example and the systems and methods herein are equally applicable to other types of printing devices that may include fewer components or more components. For example, while a limited number of printing engines and paper paths are illustrated in FIG. 8, those ordinarily skilled in the art would understand that many more paper paths and additional printing engines could be included within any printing device used with systems and methods herein.

Therefore, as shown above, printing systems (FIGS. 6-8) herein include, among other components a processor 216/224 and a printing engine 240 operatively (meaning directly or indirectly) connected to the processor 216/224. The printing engine 240 prints using color marking materials, where one of the color marking materials (e.g., a spot colorant) can be a clear marking material (e.g., clear toner). At some point, the processor 216/224 will receive an electronic document (e.g., a document stored electronically in electronic device memory) to print. The printing engine 240 prints the electronic document in a first printing pass to produce a printed media sheet having "first" markings 154.

The electronic document can have a first color in a first area 122 and a second color in a second area 124, and the first color has a different darkness level relative to the second color. For example, the first color can be a different color from the second color, the first color can be a different color shade of the second color (or one of the "colors" can simply be the white sheet (e.g. no marking material)), etc., but in any case the first color has a different darkness level relative to the second color.

Additionally, the processor 216/224 determines the amount of the clear marking material to print on top of the previously printed media sheet 154 (which already has those first markings). More specifically, here the processor 216/224 determines the different amounts of clear marking material to print on the first area 122 and the second area 124, based on the different darkness levels of the first and second colors in the first and second area of the sheet 154. After the first printing pass, the printing engine 240 prints (on the previously printed media sheet which has the first markings 154) those different amounts of clear marking material on the first area 122 and the second area 124 in a second printing pass, and this produces a printed media sheet having gloss markings 160. More specifically, this process of printing the different amounts of the clear marking material on the first area 122 and the second area 124 causes relatively lighter items on the printed media sheet to have a different amount of clear marking material relative to relatively darker items on the printed media sheet 154. The printing engine 240 can repeat the second printing pass multiple times to achieve the desired gloss effect.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand.

A raster image tangible processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of grey (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

In addition, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing system comprising:
a processor; and
a printing engine operatively connected to said processor, said processor receiving an electronic document to print, said printing engine printing said electronic document to produce a printed media sheet having first markings, said processor automatically, and without user input, determining an amount of clear marking material to print on said printed media sheet having first markings to determine different amounts of said clear marking material to print on a first area of said printed media sheet having first markings and a second area of said printed media sheet having first markings based on different darkness levels of said first area and said second area, said different darkness levels corresponding to said first area being a different color or a different color shade from said second area, and
said printing engine printing, on said printed media sheet having first markings, said different amounts of said clear marking material on said first area and said second area to produce a printed media sheet having gloss markings.

2. The printing system according to claim 1, said printing said different amounts of said clear marking material on said first area and said second area causing relatively lighter items on said printed media sheet having gloss markings to have a different amount of said clear marking material relative to relatively darker items on said printed media sheet having gloss markings.

3. The printing system according to claim 1, said printing engine repeating said printing said different amounts of said clear marking material multiple times.

4. The printing system according to claim 1, said processor determining an amount of said clear marking material during creation of halftone, print ready images.

5. The printing system according to claim 1, said electronic document using dimensional clear printing processes, said dimensional clear printing processes provide passes of flood clear toner, and said processor determining an amount of said clear marking material by avoiding said passes of flood clear toner to print different amounts of said clear marking material on said first area and said second area based on different darkness levels of said first area and said second area.

6. A printing system comprising:

a processor; and a printing engine operatively connected to said processor, said printing engine printing using color marking materials, one of said color marking materials comprising a clear marking material, said processor receiving an electronic document to print, said electronic document having a first color in a first area and a second color in a second area, said printing engine printing said electronic document in a first printing pass to produce a printed media sheet having first markings, said first color having a different darkness level relative to said second color, said processor automatically, and without user input, determining an amount of said clear marking material to print on said printed media sheet having first markings to determine different amounts of said clear marking material to print on said first area and said second area based on different darkness levels of said first area and said second area, said different darkness levels corresponding to said first area being a different color or a different color shade from said second area, and said printing engine printing, on said printed media sheet having first markings, said different amounts of said clear marking material on said first area and said second area in a second printing pass to produce a printed media sheet having gloss markings.

7. The printing system according to claim 6, said printing said different amounts of said clear marking material on said first area and said second area causing relatively lighter items on said printed media sheet having gloss markings to have a different amount of said clear marking material relative to relatively darker items on said printed media sheet having gloss markings.

8. The printing system according to claim 6, said printing engine repeating said second printing pass multiple times.

9. The printing system according to claim 6, said processor determining an amount of said clear marking material during creation of halftone, print ready images.

10. The printing system according to claim 6, said electronic document using dimensional clear printing processes, said dimensional clear printing processes provide passes of flood clear toner, and said processor determining an amount of said clear marking material by avoiding said passes of flood clear toner to print different amounts of said clear marking material on said first area and said second area based on different darkness levels of said first area and said second area.

11. A method comprising:

receiving an electronic document to print into a processor;

printing said electronic document using a printing engine operatively connected to said processor to produce a printed media sheet having first markings;

automatically, and without user input, determining an amount of clear marking material to print on said printed media sheet having first markings to determine different amounts of said clear marking material to print on a first area of said printed media sheet having first markings and a second area of said printed media sheet having first markings based on different darkness levels of said first area and said second area using said processor, said different darkness levels corresponding to said first area being a different color or a different color shade from said second area; and printing, on said printed media sheet having first markings, said different amounts of said clear marking material on said first area and said second area to produce a printed media sheet having gloss markings, using said printing engine.

12. The method according to claim 11, said printing said different amounts of said clear marking material on said first area and said second area causing relatively lighter items on said printed media sheet having gloss markings to have a different amount of said clear marking material relative to relatively darker items on said printed media sheet having gloss markings.

13. The method according to claim 11, further comprising repeating said printing said different amounts of said clear marking material multiple times.

14. The method according to claim 11, said determining an amount of said clear marking material being a process performed during creation of halftone, print ready images.

15. The method according to claim 11, said electronic document using dimensional clear printing processes, said dimensional clear printing processes provide passes of flood clear toner, and said determining an amount of said clear marking material being a process that avoids said passes of flood clear toner to print different amounts of said clear marking material to print on said first area and said second area based on different darkness levels of said first area and said second area.

16. A method comprising:

receiving an electronic document to print into a processor, said electronic document having a first color in a first area and a second color in a second area, said processor being operatively connected to a printing engine that prints using color marking materials, one of said color marking materials comprising a clear marking material;

printing said electronic document using said printing engine in a first printing pass to produce a printed media sheet having first markings, said first color having a different darkness level relative to said second color;

automatically, and without user input, determining an amount of said clear marking material to print on said printed media sheet having first markings to determine different amounts of said clear marking material to print on said first area and said second area based on different darkness levels of said first area and said second area using said processor, said different darkness levels corresponding to said first area being a different color or a different color shade from said second area; and printing, on said printed media sheet having first markings, said different amounts of said clear marking material on said first area and said second area in a second printing pass to produce a printed media sheet having gloss markings using said printing engine.

17. The method according to claim 16, said printing said different amounts of said clear marking material on said first area and said second area causing relatively lighter items on said printed media sheet having gloss markings to have a different amount of said clear marking material relative to relatively darker items on said printed media sheet having gloss markings.

18. The method according to claim 16, further comprising repeating said second printing pass multiple times.

19. The method according to claim 16, said determining an amount of said clear marking material being a process performed during creation of halftone, print ready images.

20. The method according to claim 16, said electronic document using dimensional clear printing processes,
   said dimensional clear printing processes provide passes of flood clear toner, and
   said determining an amount of said clear marking material being a process that avoids said passes of flood clear toner to print different amounts of said clear marking material to print on said first area and said second area based on different darkness levels of said first area and said second area.

* * * * *